(12) United States Patent
Sikeler

(10) Patent No.: US 11,644,056 B2
(45) Date of Patent: May 9, 2023

(54) MULTIFUNCTIONAL CORNER CONNECTOR

(71) Applicant: Anton Schneider GmbH & Co KG, Kenzingen (DE)

(72) Inventor: Marcel Sikeler, Empfingen (DE)

(73) Assignee: Anton Schneider GmbH & Co KG, Kenzingen (DE)

( * ) Notice: Subject to any disclaimer, the term of this patent is extended or adjusted under 35 U.S.C. 154(b) by 64 days.

(21) Appl. No.: 17/455,504

(22) Filed: Nov. 18, 2021

(65) Prior Publication Data

US 2022/0160138 A1 May 26, 2022

(30) Foreign Application Priority Data

Nov. 25, 2020 (DE) ...................... 20 2020 106 774.5

(51) Int. Cl.
*F16B 12/44* (2006.01)
*F16B 12/14* (2006.01)
(Continued)

(52) U.S. Cl.
CPC .............. *F16B 12/44* (2013.01); *F16B 12/14* (2013.01); *F16B 12/54* (2013.01); *A47C 19/12* (2013.01);
(Continued)

(58) Field of Classification Search
CPC ..... A47C 19/12; A47C 19/122; A47C 19/124; A47C 19/126; A47C 19/128; A47C 19/14; E04B 1/1903; F16B 7/044; F16B 7/048; F16B 7/185; F16B 12/14; F16B 12/44; F16B 12/50; F16B 12/56; F16B 2012/145; F16B 2012/446; Y10T 403/34; Y10T 403/341; Y10T 403/342; Y10T 403/347;
(Continued)

(56) References Cited

U.S. PATENT DOCUMENTS 3,357,727 A * 12/1967 Finkenstein .......... F16B 17/004
403/176
3,545,796 A * 12/1970 William .................. F16B 12/40
403/187
(Continued)

FOREIGN PATENT DOCUMENTS

DE 2022294 A1 * 3/1971 ........ F16B 2012/446
DE 21 55 234 A1 5/1973
(Continued)

*Primary Examiner* — Josh Skroupa
(74) *Attorney, Agent, or Firm* — Orbit IP

(57) ABSTRACT

An one-piece corner connector for connecting two frame bars at right angles to one another includes a right-angle bracket having two angle legs, an intermediate plate, and two U-profile connecting pieces at right angles, having a middle leg and two side legs for insertion into the plug-in openings in the frame bars which are open at one end. The middle legs of the U-profile connecting pieces are formed on and run with their outer side parallel to the intermediate plate. The one outer side legs of the U-profile connecting pieces are each formed on one of the angle legs and run with their outer side parallel to the outer side of the angle leg. The other inner side legs of the U-profile connecting pieces are connected to one another by means of a wall element which is angled from the intermediate plate.

17 Claims, 3 Drawing Sheets

(51) Int. Cl.
*F16B 12/54* (2006.01)
*A47C 19/12* (2006.01)

(52) U.S. Cl.
CPC ... *F16B 2012/145* (2013.01); *F16B 2012/446* (2013.01)

(58) Field of Classification Search
CPC ............... Y10T 403/44; Y10T 403/443; Y10T 403/447
See application file for complete search history.

(56) References Cited

U.S. PATENT DOCUMENTS

| | | | | | |
|---|---|---|---|---|---|
| 3,854,831 | A | * | 12/1974 | Gutner | A47B 47/0008 403/176 |
| 3,858,989 | A | * | 1/1975 | Field | A47B 47/0008 403/171 |
| 3,886,710 | A | * | 6/1975 | Krause | F16B 12/40 403/172 |
| 4,027,987 | A | * | 6/1977 | Berkowitz | F16B 7/0446 403/172 |
| 4,101,229 | A | * | 7/1978 | Weibull | F16B 7/185 403/171 |
| 4,323,319 | A | * | 4/1982 | Adams | F16B 7/04 403/171 |
| 4,678,359 | A | * | 7/1987 | Keen, Egbert | A47B 47/0008 403/176 |
| 4,691,970 | A | * | 9/1987 | Neri | A47B 47/0008 312/265.5 |
| 4,770,560 | A | * | 9/1988 | Ott | F16B 12/50 403/348 |
| 5,066,161 | A | * | 11/1991 | Pinney | A47B 47/0008 403/172 |
| 6,902,068 | B1 | * | 6/2005 | Fontana | H02B 1/01 312/257.1 |
| 8,297,450 | B2 | * | 10/2012 | Zavidniak | H05K 7/183 211/13.1 |
| 9,951,802 | B2 | * | 4/2018 | Keller | F16B 12/50 |
| 10,309,680 | B2 | * | 6/2019 | Ling | F24F 13/0263 |
| 10,781,838 | B2 | * | 9/2020 | Koepke | F16B 7/0446 |
| 11,536,020 | B2 | * | 12/2022 | Bowron | E04B 1/1903 |
| 2006/0182492 | A1 | * | 8/2006 | Keller | F16B 13/0858 403/170 |
| 2021/0145172 | A1 | * | 5/2021 | Cecol | F16B 12/46 |

FOREIGN PATENT DOCUMENTS

| | | | | |
|---|---|---|---|---|
| DE | 29 08 475 C2 | | 10/1981 | |
| DE | 102006020437 A1 | * | 11/2007 | ............. F16B 7/185 |
| DE | 20 2014 101 057 U1 | | 7/2015 | |
| FR | 2439898 A1 | * | 5/1980 | ............. F16B 7/185 |
| GB | 2153955 A | * | 8/1985 | ............. F16B 12/36 |
| JP | 2014-081053 A | | 5/2014 | |
| WO | WO-2019198660 A1 | * | 10/2019 | ............. F16B 7/044 |

* cited by examiner

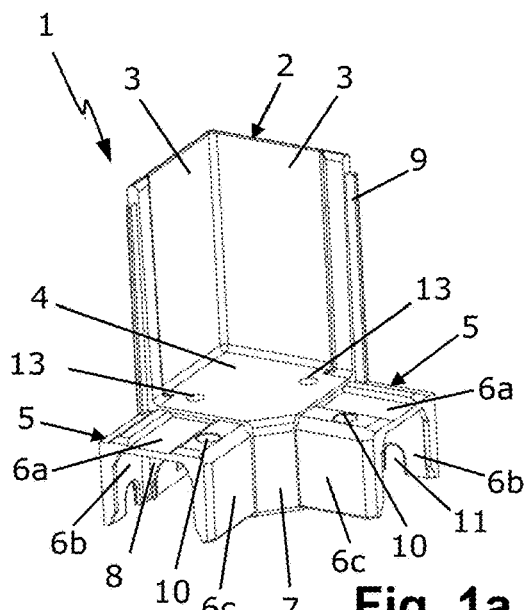
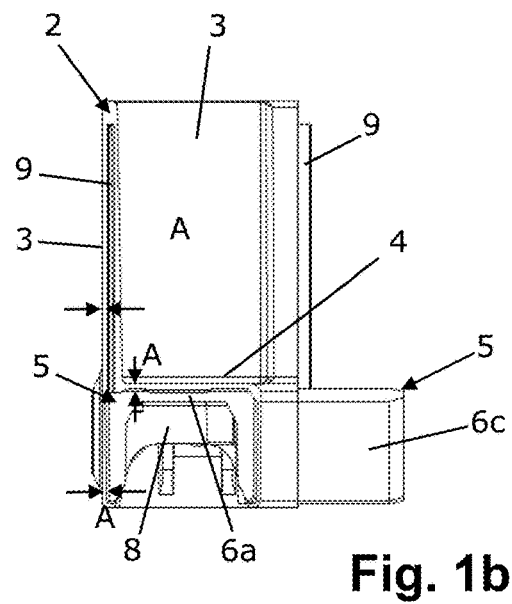
Fig. 1a                Fig. 1b
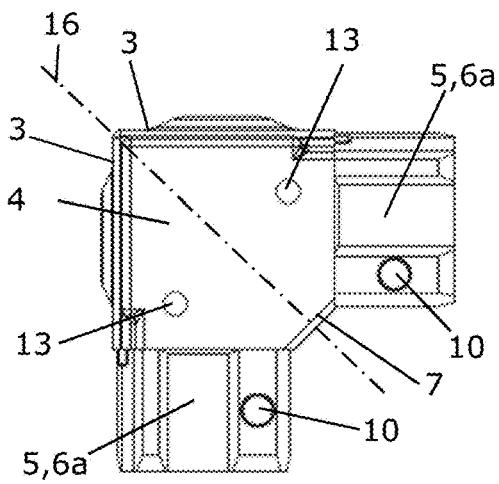
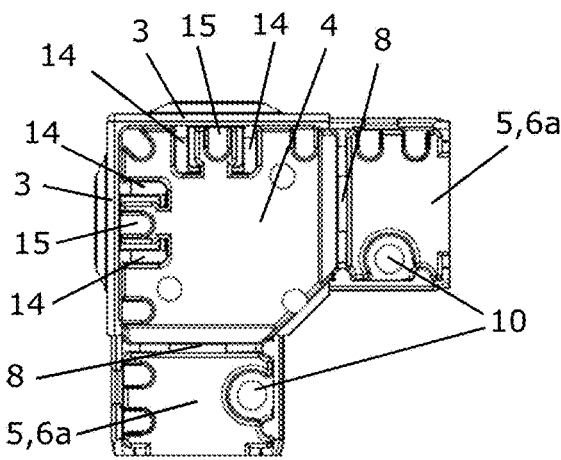
Fig. 1c                Fig. 1d
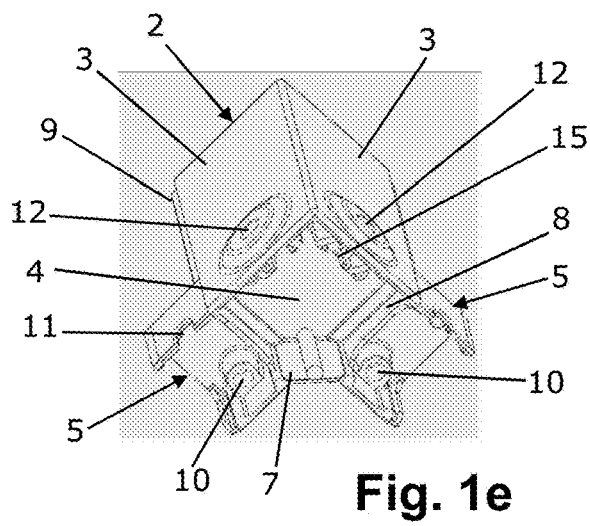
Fig. 1e

MULTIFUNCTIONAL CORNER CONNECTOR

CROSS REFERENCE TO RELATED APPLICATIONS

This application claims priority to German Utility Model Application No. DE 20 2020 106 774.5, filed Nov. 25, 2020, the entire contents of which are hereby incorporated in full by this reference.

DESCRIPTION

Field of the Invention

The invention relates to a one-piece corner connector ("corner node") for connecting two frame bars which are at right angles to one another and also to a frame comprising four frame bars and four corner connectors and also to a foldaway bed comprising a carcass and a foldaway bed frame.

Background of the Invention

Corner connectors of this kind for creating a frame structure are well enough known in the art.

SUMMARY OF THE INVENTION

By contrast, the problem addressed by the invention is that of specifying a multifunctional corner connector which can also assume other functions, in addition to connecting frame bars.

This problem is solved according to the invention by a one-piece corner connector comprising the features of claim 1. Advantageous developments are specified in the dependent claims.

According to the invention, the corner connector assumes further functions such as, in the case of a foldaway bed, for example, the connection of a gas spring for balancing the force when the foldaway bed is folded up and folded down, the use of the corner connector for support when adjusting the height of a front plate and the fastening and bearing of an adjustable foot.

The invention also relates to a frame, in particular a bed frame, comprising four frame bars and four corner connectors as designed as above, wherein the U-profile connecting pieces of the corner connectors are inserted into plug-in openings which are open at one end in the frame bars and are fastened to the respective frame bar by means of screws which are screwed into the holes in the middle legs of the U-profile connecting pieces. The screws are advantageously self-tapping screws, in order for the frame bars to be securely connected to one another.

The profile side of the frame bars, which forms the outer side of the frame, preferably has an extension leg which, viewed in the profile direction of the right-angle bracket, ends flush with the angle leg of the corner connector. The extension legs are high frame flanks, between which a mattress is securely held.

Preferably, the outer sides of the angle legs and the frame outer side of the frame bars and/or the intermediate plate and the frame bars are each flush with one another, resulting in a smooth or stepless frame outer side.

The invention finally also relates to a foldaway bed comprising a carcass and a bed frame as configured above, which is mounted in the carcass so as to be pivotable between a folded-up, vertical position and a folded-down, horizontal position.

An adjustable foot or a spring (e.g. gas spring) is preferably fastened to the corner connector by means of a screw which is screwed through the hole in the angle leg into a hexagonal nut which is inserted in the profile pocket of the angle leg in a form-fitting manner. The corner connector is therefore used to connect different assemblies (gas spring for force compensation, adjustable foot) by means of the screw/hexagonal nut connection.

A front panel is advantageously fastened to the frame in a height-adjustable manner, in that an angle bracket fastened to the front panel rests against a partition wall of the corner connector by means of an adjusting screw when the bed frame is folded up, and the adjusting screw can be turned through the hole in the angle leg of the corner connector. The partition wall therefore represents the support surface for the height adjustment mechanism, wherein the rotational movement of the screw is converted into a linear (height) movement of the front plate.

Further advantages of the invention emerge from the description, claims and drawing. Likewise, the features referred to above and those listed below can be used individually or collectively in arbitrary combinations. The embodiment shown and described should not be regarded as an exhaustive list, but it is rather exemplary by nature in its description of the invention.

BRIEF DESCRIPTION OF THE DRAWINGS

In the drawing:

FIGS. 1a-1e show the corner connector according to the invention in a perspective view from above (FIG. 1a), in a side view (FIG. 1b), in a plan view from above (FIG. 1c) and from below (FIG. 1d) and also in a perspective view from below (FIG. 1e);

DETAILED DESCRIPTION OF THE PREFERRED EMBODIMENTS

Figure 2:
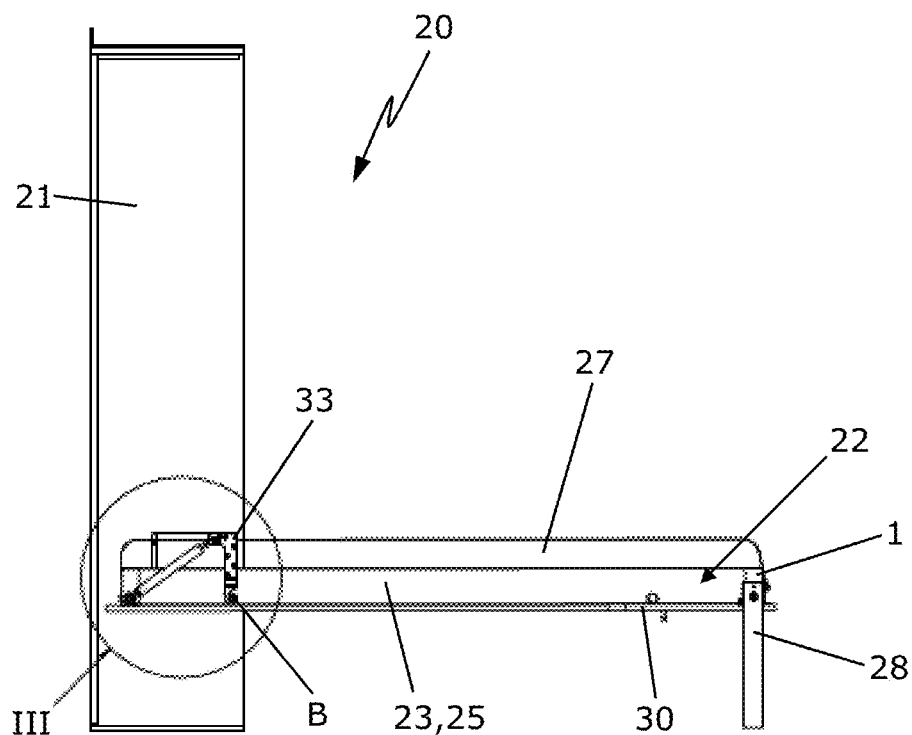
FIG. 2 shows a foldaway bed according to the invention comprising a bed frame folded down from a carcass.

The one-piece corner connector 1 shown in FIGS. 1a-1e serves to connect two frame bars which are at right angles to one another and comprises:
- a right-angle bracket (equal-sided L-profile) 2 having two angle legs 3,
- an intermediate plate 4 present in the right-angle bracket 2 at right angles to the profile direction thereof, and
- two U-profile connecting pieces 5 oriented at right angles to one another, having a middle leg 6a and two side legs 6b, 6c.

The middle legs 6a of the U-profile connecting pieces 5 are formed on the intermediate plate 4 and run with their upper side, which can be seen in FIG. 1a, parallel to the intermediate plate 4. The outer side legs 6b of the U-profile connecting pieces 5 are each formed on one of the angle legs 3 and run with their outer side parallel to the outer side of the angle leg 3. The inner side legs 6c and the U-profile connecting piece 5 are connected to one another by means of a wall element 7 which is downwardly angled from the intermediate plate 4. A partition wall 8 is present in each case between the U-profile connecting pieces 5 and the intermediate plate 4.

The corner connector 1 is downwardly open, wherein the right-angle bracket 2 and the side legs 6b, 6c of the two U-profile connecting pieces 5 end at the same height below.

The outer sides of the middle legs 6a are set back downwardly in respect of the upper side of the intermediate plate 4, and the outer sides of the outer side legs 6b are set back inwardly in respect of the outer sides of the angle legs 3 by a dimension A in each case. The angle legs 3 are lengthened above the intermediate plate 4 by lateral strips 9, the outer sides of which are inwardly set back in parallel by the distance A in respect of the outer sides of the angle legs 3.

The middle legs 6a each have a hole 10 and the outer side legs 6b each have a recess 11 which is open to the lower end of the leg. The angle legs 3 each have a hole 12—roughly halfway up the outer leg 6b of the U-profile connecting pieces 5—and the intermediate plate 3 has two holes 13. On the inner side of the angle legs 3, two rectangular profiles 14 which face one another are formed on both sides of the holes 12, said rectangular profiles forming a profile pocket 15 for a screw nut which is open in the profile direction of the right-angle bracket 2, namely downwardly.

As shown in the exemplary embodiment, the corner connector 1 is designed in a mirror-symmetrical manner to a diagonal plane 16 of the right-angle bracket 2.

FIG. 2 shows a foldaway bed 20 comprising a carcass 21 and a bed frame 22, which is mounted in the carcass 21 so as to pivot about a horizontal axis B between a folded-up, vertical position and the folded-down, horizontal position, as shown, by means of two pivot hinges 33. The bed frame 22 is assembled from four frame bars 23 and four corner connectors 1.

Figure 3:
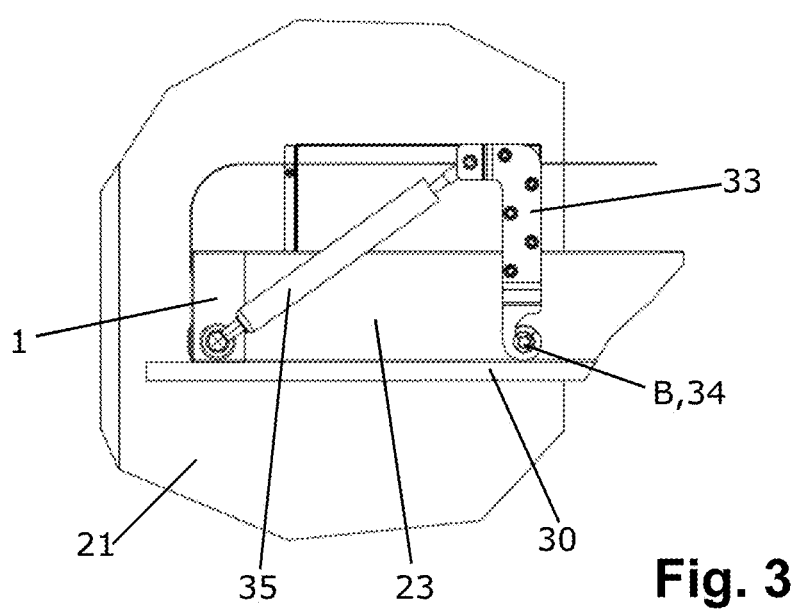
FIG. 3 shows a detail of the foldaway bed according to III in FIG. 2.
Figure 4:
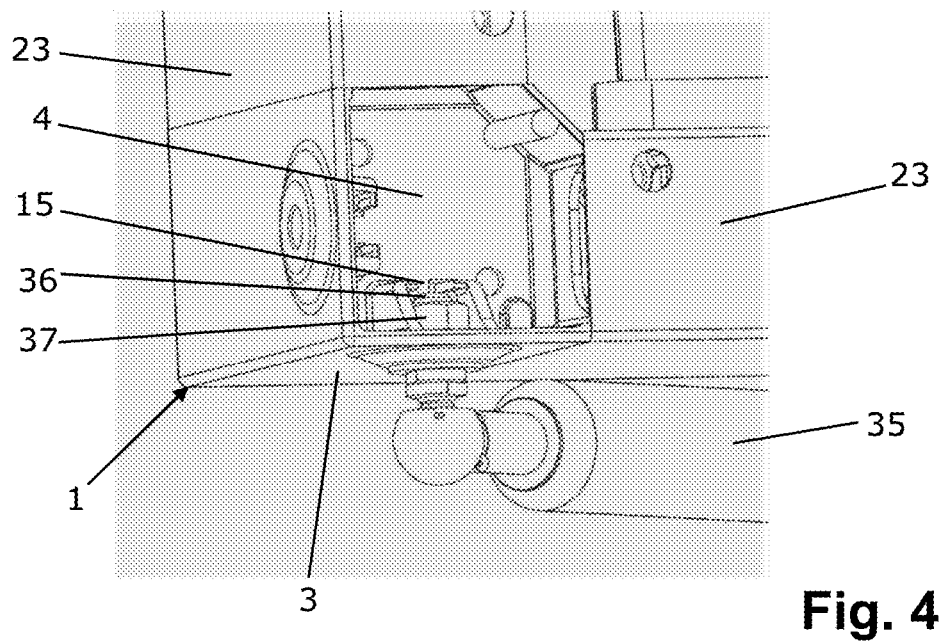
FIG. 4 shows a view from below of the left corner of the foldaway bed in FIG. 2 when it is folded down.

FIG. 3 shows the pivot hinge 33 fastened to the carcass 21, in which a laterally projecting bearing pin 34 of the longitudinal bar 23 is suspended and is mounted therein so as to be rotatable about the axis B. A gas spring 35 is fastened by means of a screw 36 to the pivot hinge 33 at one end and to the corner connector 1 on the carcass side at the other end (FIG. 4), said screw being screwed through the hole 12 in the lateral angle leg 3 into a hexagonal nut 37, which is inserted in the profile pocket 15 of the angle leg 3 in a form-fitting manner.

Figure 5:
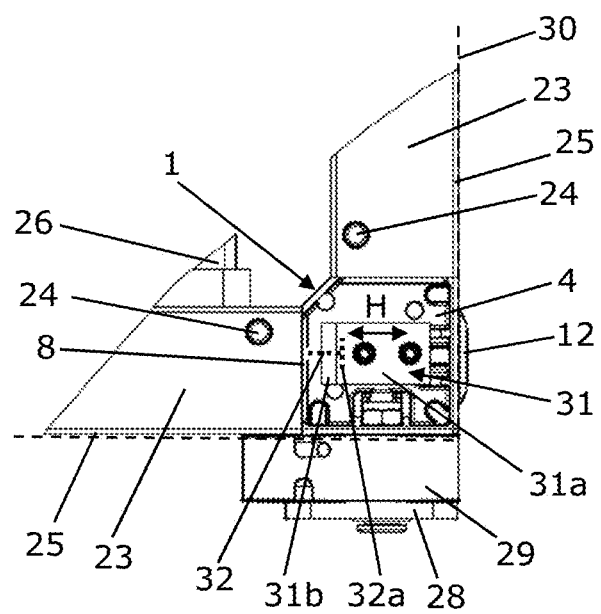
FIG. 5 shows a view from below of the right corner of the foldaway bed in FIG. 2 when it is folded down.

As shown in FIG. 5, the corner connectors 1 are inserted into plug-in openings in the frame bars 23 at one end and fastened therein by means of self-tapping screws 24 which are screwed into the holes 10 in the U-profile connecting pieces 5. The profile side of the frame bars 23 which forms the outside of the frame has a raised extension leg 25 which, viewed in the profile direction of the right-angle bracket 2, ends flush with the angle leg 3 of the corner connector 1. The rear offset A corresponds to the wall thickness of the plug-in opening in the frame bars 23, so that on one side the upper side of the frame bars 23 is flush with the intermediate plate 4, and on the other side the outer side of the frame bars 23 is flush with the angle legs 3 of the corner connectors. On the upper side of the frame bars 23 lies a slatted frame 26 and in turn a mattress 27 lies on this, which is laterally secured by the raised extension legs 25.

As shown in FIGS. 2 and 5, an adjusting foot 28 is fastened to each of the two front corner connectors 1. For this purpose, a bearing block 29 is screwed by means of a screw to the lateral angle leg 3 of the corner connector 1 in each case, said screw being screwed through the hole 12 in the angle leg 3 into a hexagonal nut which is inserted in the profile pocket 15 of the angle leg 3 in a form-fitting manner, as described below with reference to FIG. 4. The adjusting foot 28 is in turn mounted on the bearing block 29 freely suspended about a horizontal axis and is therefore always vertically oriented due to gravity. In the folded-down position, the adjusting foot 28 stands on the floor. In addition, the bearing block 29 is screwed to the recess 11 by means of a self-tapping screw.

Furthermore, a front plate 30 of the bed frame 22 which closes the carcass opening in the folded-up position is shown in FIGS. 2, 3 and 5. The holes 13 in the intermediate plate 4 are provided for the fastening/securing of the front plate 30.

As shown in FIG. 5, the front plate 30 can be adjusted in the vertical height direction H once it has been pivoted into the folded-up position. For this purpose, in the upper corner region of the folded-up front plate 30, the one (vertical) leg 31a of an L-angle bracket 31 is screwed to the front plate 30 on the inner side, the other (horizontal) leg 31b of said L-angle bracket projecting into the interior of the corner connector 1 and being supported by means of a vertical adjusting screw 32 on the horizontally oriented partition wall 8 of the corner connector 1. With the help of a tool (e.g. Allen key), which engages with a tool socket in the screw head 32a of the adjusting screw 32 in a form-fitting manner from above through the hole 12 in the horizontally oriented angle leg 3, the adjusting screw 32 can be turned and the horizontal leg 31b, along with the front plate 30, can therefore be adjusted in terms of height H.

What is claimed is:

1. A one-piece corner connector for connecting two frame bars which are at right angles to one another, comprising:
   a right-angle bracket having two angle legs;
   an intermediate plate present in the right-angle bracket at right angles to the profile direction thereof; and
   two U-profile connecting pieces oriented at right angles to one another, having a middle leg and two side legs for insertion into plug-in openings in the frame bars which are open at one end;
   wherein the middle legs of the U-profile connecting pieces are formed on the intermediate plate and run with their outer side parallel to the intermediate plate;
   wherein the one outer side legs of the U-profile connecting pieces are each formed on one of the angle legs and run with their outer side parallel to the outer side of the angle leg, and the other inner side legs of the U-profile connecting pieces are connected to one another by means of a wall element which is angled from the intermediate plate; and
   wherein the middle legs of the U-profile connecting pieces each have a hole.

2. The corner connector according to claim 1, wherein the outer sides of the outer side legs are inwardly set back in parallel in respect of the outer sides of the angle legs and/or the outer sides of the middle legs are inwardly set back in parallel in respect of the outer side of the intermediate plate.

3. The corner connector according to claim 1, wherein the right-angle bracket and the side legs of the two U-profile connecting pieces end at the same height.

4. The corner connector according to claim 1, wherein the angle legs each have a hole and wherein on the inner side of the angle legs, two rectangular profile sections which face one another are formed on both sides of the hole, in order to form a profile pocket which is open in the profile direction of the right-angle bracket away from the intermediate plate.

5. The corner connector according to claim 1, wherein the intermediate plate has multiple holes.

6. The corner connector according to claim 1, wherein the outer side legs each have recesses which are open to the free end of the leg.

7. The corner connector according to claim 1, wherein the angle legs are each lengthened above the intermediate plate by a lateral strip, the outer side of which is inwardly recessed in parallel in respect of the outer side of the angle leg.

8. The corner connector according to claim 1, wherein the corner connector is open on the side of the U-profile connecting pieces.

9. The corner connector according to claim 1, wherein there is a partition wall between the U-profile connecting pieces and the intermediate plate in each case.

10. The corner connector according to claim 1, wherein the corner connector is designed in a mirror-symmetrical manner to a diagonal plane of the right-angle bracket.

11. A frame, comprising four frame bars and four corner connectors according to claim 1, wherein the U-profile connecting pieces of the corner connectors are inserted into plug-in openings which are open at one end in the frame bars and are fastened to the respective frame bar by means of screws which are screwed into the holes in the middle legs of the U-profile connecting pieces.

12. The frame according to claim 11, wherein the profile side of the frame bars, which forms the outer side of the frame, has an extension leg which, viewed in the profile direction of the right-angle bracket, ends flush with the angle leg of the corner connector.

13. The frame according to claim 12, wherein the outer sides of the angle legs and the frame outer side of the frame bars are flush with one another.

14. The frame according to claim 13, wherein the intermediate plate and the frame bars are flush with one another.

15. A foldaway bed comprising a carcass and a bed frame according to claim 11, which is mounted in the carcass so as to be pivotable between a folded-up, vertical position and a folded-down, horizontal position.

16. The foldaway bed according to claim 15, wherein an adjustable foot or a spring is fastened to the corner connector by means of a screw which is screwed through the hole in the angle leg into a hexagonal nut which is inserted in the profile pocket of the angle leg in a form-fitting manner.

17. The foldaway bed according to claim 15, wherein a front panel is fastened to the frame in a height-adjustable manner, wherein an angle bracket fastened to the front panel rests against a partition wall of the corner connector by means of an adjusting screw when the bed frame is folded up, and wherein the adjusting screw can be turned through the hole in the angle leg of the corner connector.

\* \* \* \* \*